United States Patent

Anker

[15] 3,642,498

[45] Feb. 15, 1972

[54] METHOD OF PREPARING KERATIN-CONTAINING FILMS AND COATINGS

[72] Inventor: Charles A. Anker, Minneapolis, Minn.
[73] Assignee: General Mills, Inc.
[22] Filed: Sept. 18, 1969
[21] Appl. No.: 859,198

[52] U.S. Cl. .................................. 99/166, 99/18, 99/169, 99/171 LP, 106/155, 106/161, 117/164, 260/123.7, 264/212
[51] Int. Cl. .................................. A23b 1/10, C08r 7/04
[58] Field of Search ............... 99/166, 18, 168, 169, 171 LP; 106/155, 161, 135, 311; 117/164; 264/212; 260/123.7; 252/364, 311

[56] References Cited

UNITED STATES PATENTS

| | | | |
|---|---|---|---|
| 2,445,028 | 7/1948 | Jones et al. | 106/155 |
| 2,427,857 | 9/1947 | Hamill | 99/166 |
| 2,474,339 | 6/1949 | Ward et al. | 106/155 X |
| 2,814,851 | 12/1957 | Hervey | 106/155 X |
| 2,158,481 | 5/1939 | Hansen et al. | 99/166 UX |
| 3,464,825 | 9/1969 | Anker | 99/18 |

OTHER PUBLICATIONS

Chemicals Used in Food Processing, Nat. Academy of Sciences, 1965, page 265

*Primary Examiner*—Morris O. Wolk
*Assistant Examiner*—Stephen B. Davis
*Attorney*—Anthony A. Juettner and Gene O. Enockson

[57] ABSTRACT

Isolated keratin is dispersed in an alkaline medium consisting of alcohol and water. The dispersion is applied to solid substrates including food and dried to form an edible coating. The coating can be stripped from the substrate as a continuous film. A portion of a second proteinaceous substance and a plasticizer can be included in the dispersion.

14 Claims, No Drawings

METHOD OF PREPARING KERATIN-CONTAINING FILMS AND COATINGS

The present invention relates to a new and useful process for preparing films and coatings comprised of keratin. This invention also relates to the resulting films and coated articles. The films and coatings of this invention are strong and flexible and find numerous uses, particularly in the food area.

Although solutions of keratin from various natural sources have been produced, these solutions have sometimes not been suited for producing films because of one or more problems. For example, some prior attempts to produce a highly concentrated solution of keratin have given solutions containing large amounts of undispersed keratin. These solutions, because of their lack of homogeneity, tend to form weak films when they are cast. Further, the removal of the undispersed fraction of the keratin source material to attempt to solve this problem has not been commercially feasible. In addition, some means heretofore known for preparing keratin articles have not shown how to prepare keratin materials suitable for food applications.

I have discovered a new process of preparing films and coatings from certain concentrated, relatively homogeneous dispersions of keratin. Many of the films and coatings thus formed are found to be useful in a variety of food applications. The dispersions of keratin used in my process are made in various alcohol-water mixtures, and keratin coatings and films are prepared therefrom by a commercially practicable means.

The films and coatings of this invention are essentially all protein. Thus, when reagents used in their preparation are selected so as to not include harmful or disagreeable chemicals, they are bland and edible. Further, no reagents are required in this invention which impart undesirable odors to the products.

This invention has commercial attractiveness for several reasons. The keratin used is very dispersible in the alkaline alcohol-water mixtures, and it is thus unnecessary to attempt to separate large amounts of the undispersed keratin from the dispersion. Temperatures above the boiling point of the alcohol-water mixtures are not necessary to disperse the keratin, and thus high cost pressurized processing equipment is not required. A further advantage of this invention is that the dispersions are not made directly from raw keratin sources, but are prepared from purified keratin sources. The products therefrom may thus present a "cleaner" appearance, nondispersible materials being essentially absent.

It is thus an object of the present invention to provide a new process whereby keratin coatings and films are prepared from fluid, alkaline, relatively homogeneous dispersions of keratin in an alcohol-water dispersing medium. It is also an object of this invention to provide keratin films and coatings prepared according to this new process. A further object is to provide various articles, and particularly food articles, which are wrapped, coated or encased by various of the keratin films and coatings. These and other objectives will become apparent in the description which follows.

As indicated, the films and coatings of this invention are prepared from dispersions comprising keratin. Keratin is one of the fibrous proteins found in various animals. Its essential function is to provide protection to the bodies of organisms, and is commonly found to be a principal constituent of hair, hooves, feathers, hides and the like. Although keratin may be isolated from these and other natural sources, it is preferred for this invention to isolate keratin from poultry feathers. The feathers may be whole or in ground form, although processing of the latter is generally more convenient.

The keratin useful in the process of the present invention can be isolated from the natural sources thereof by various known procedures which preferably include the use of a reducing agent. The reducing agent appears to perform a variety of functions including increasing of the solubility or dispersibility of the keratin and/or improving the odor and/or flavor of the recovered isolate. When used during the initial isolation step, the reducing agent apparently increases the solubility or dispersibility of the keratin by breaking various disulfide bonds, both in the polypeptide chains (intrachain) and in the cross-linking of different polypeptide chains (interchain). When an alkali metal sulfide is used as the alkaline solubilizing agent, the keratin which is subsequently acid precipitated often has a bad odor indicating that hydrogen sulfide is being given off. Additionally, hydrogen sulfide may be given off during the precipitation step itself. In this instance, a reducing agent, such as an alkali metal sulfite appears to not only break some disulfide bonds but also to yield sulfurous acid which reacts with the hydrogen sulfide and any free sulfur formed during the sulfide solubilization or subsequent precipitation of the keratin. The products resulting from this reaction are theorized to be water soluble compounds such as $H_2S_2O_3$, $H_2S_3O_6$ and/or $H_2S_4O_6$. These compounds are not volatile and do not precipitate with the protein on addition of the acid precipitating agent.

One preferred procedure for isolating the keratin, as indicated above, comprises extracting same from the natural sources with an aqueous alkali metal sulfide solution, treating the resulting aqueous extract with an alkali metal sulfite and then precipitating the protein by the addition of an acid. The resulting product may also be dried if desired. This process can be used to recover keratin protein from any naturally occurring keratin source material, and is particularly valuable in the recovery of high quality keratin protein from feathers.

The first step of this preferred procedure is to extract the keratin source material with an aqueous solution of an alkali metal sulfide. Representative sulfides are sodium sulfide and potassium sulfide. Preferably the keratin source is in a relatively subdivided form to promote the extraction. For example, whole feathers can be extracted with the sulfide solution but better extraction is obtained if the feathers are cut into smaller pieces. The extraction is preferably carried out at temperatures of about 20° to 50° C. The alkali metal sulfide is preferably used in an amount of about 2.5 to 20 percent by weight based on the weight of the material being extracted. It is also preferred to use relatively dilute solutions of the alkali metal sulfide. In this way the extracted keratin protein is more readily dissolved in the extracting medium. Thus the aqueous solutions preferably contain from about 0.25 to 2 percent by weight of the alkali metal sulfide and enough of the solution is used so that the concentration of the extracted keratin protein therein remains below about 15 percent by weight, and is preferably in the range of 1 to 10 percent by weight. Sodium sulfide ($Na_2S$) is the preferred extractant.

The protein containing solution is separated from the insoluble residue by conventional means such as decantation, filtration or the like. The insoluble residue can be further extracted or washed with water or fresh aqueous sulfide solution and the resulting liquids can be treated separately or combined with the first obtained protein containing solution. In this way, the ultimate yield of protein is increased somewhat although the major amount of the protein is normally obtained in the initial extraction step.

The protein containing solution is next treated with the alkali metal sulfite. Representative sulfites are sodium and potassium sulfite and bisulfite. A preferred treating agent is sodium sulfite ($Na_2SO_3$). The alkali metal bisulfites, such as sodium bisulfite (Na $HSO_3$), are less preferred since they release sulfur dioxide at a faster rate and thus may cause some localized premature precipitation unless added at a slower rate than the sodium sulfite. The sulfite is used in a molar excess in relation to the amount of alkali metal sulfide used in the initial extraction step. Preferably the molar ratio of the sulfite to the sulfide is in the range of 1.01–10.0:1.0. The sulfite in dry form or in the form of an aqueous solution thereof is simply added to the protein-containing solution in the designated amount. The protein-containing solution can be stirred during or after the addition to effect a more uniform distribution of the sulfite therein.

After the described sulfite treating step, the protein is precipitated by the addition of acid in the conventional manner. Any of a variety of inorganic or organic acids can be used. Representative acids are hydrochloric acid, sulfuric acid, acetic acid, phosphoric acid and the like. The acid is used in an amount sufficient to lower the pH of the protein containing solution to the isoelectric point or below of the protein. Preferably, the pH is reduced to below about 4.5 and the range of 3.0 to 4.5 is especially suitable.

The precipitated protein is separated from the protein barren liquid by conventional techniques—i.e., decantation, filtration and the like. In all of the steps of the process the temperature is not critical but is preferably in the range of 20° to 50° C.

The precipitated and separated protein can be dried if desired. Any conventional drying technique can be used—i.e., spray, drum, tray, freeze or the like. The resulting keratin protein is a high quality product having good odor, color and flavor characteristics.

The following specific examples will serve to illustrate this preferred process of recovering the keratin from natural sources.

EXAMPLE A

One hundred grams of cut turkey feathers were added to 1,333 ml. of an aqueous solution of sodium sulfide (the solution consisted of water and 32 g. $Na_2S \cdot 9H_2O$). The resulting mixture was held at 40° C. for 2 hours and then centrifuged for 20 minutes at 2,000 r.p.m. The supernatant liquid was decanted and saved. The residue was mixed with 1,333 ml. water and then centrifuged as above. The second supernatant liquid was decanted and saved. The residue was discarded. Each of the supernatant liquids was made 0.3 molar with respect to sodium sulfite (50.4 g. sodium sulfite added to each). The pH of each of the liquids was adjusted to pH 4.2 by the addition of 6 $N$ hydrochloric acid (the first required 81 ml. and the second 53 ml. of the acid). During the acidification of the liquids no hydrogen sulfide was liberated and no sulfur dioxide odor was noted. The resulting precipitates were separated from the liquids by centrifugation and washed once with 0.01 $N$ hydrochloric acid (1 liter) and three times with 1 liter portions of acetone. The protein was then allowed to air dry at room temperature. There was obtained 60.4 g. protein from the first supernatant liquid and 8.1 g. protein from the second supernatant liquid. The protein was light colored, bland and substantially odor-free.

EXAMPLE B

Keratin was isolated from chicken feathers by the following pilot plant scale operation. Forty-five and one-half pounds of clean, dry chicken feathers were mixed with 75 gal. water containing 8.1 lb. of commercial grade sodium sulfide (60% $Na_2S$). The temperature of the mixture was 103° F. The mixture was agitated for 2 hours and the temperature of the resulting digest mixture was 98° F. The digest was passed through a coarse screen to remove pieces of the undigested feather residue. To the digest was added 90 gal. water containing 23.6 lb. commercial grade sodium sulfite. The pH of the digest was lowered to 8.2 by adding 100 lb. 1 $N$ hydrochloric acid. The digest was then filtered through a filter press using 28 lb. filter aid and a 1×1 filter cloth. The filtering time was 2 hours. The clear amber filtrate collected was pH 8.7. To the filtrate was added 190 lb. 1 $N$ HCl over about 130 minutes to lower the pH to 4.2. The resulting protein precipitate was allowed to settle overnight, and the supernatant liquid was removed. The precipitate was washed with 60 gal. water and allowed to settle in the supernatant wash water for 5 hours, after which time the supernatant liquid was removed. An additional 60 gal. water was added to the precipitate and allowed to stand overnight. The supernatant liquid was removed and the protein precipitate was collected by filtering. The protein cake thus formed was freeze dried to yield 11.55 lb. of dry keratin protein.

Additional processes or procedures other than the preferred one described above, may be used to isolate keratin in a form suitable for use in our invention. One such procedure involves digesting keratin source materials (e.g., poultry feathers) in an alcohol-water mixture which contains ammonium sulfite. In another satisfactory process for obtaining keratin suitable for use in our invention, keratin source materials are digested in a mercaptoethanol-alcohol-water mixture and filtered to remove impurities, and the keratin is obtained by centrifugation of the resulting gel mixture. In a further satisfactory process of obtaining keratin, the latter method is followed, except that the mercaptoethanol-alcohol-water mixture is made alkaline by the addition of a base such as sodium hydroxide, potassium hydroxide and the like. In these procedures for isolating keratin, the ammonium sulfite and mercaptoethanol reducing agents act primarily as aids for increasing the solubility or dispersibility of the keratin protein.

The following examples will serve to illustrate these additional suitable processes we have used for obtaining keratin isolates useful in our invention.

EXAMPLE C

A mixture consisting of 370 g. wet chicken feathers (200 g., dry basis), 29.7 g. $(NH_4)_2SO_3 \cdot H_2O$, 221 ml. 1 $N$ hydrochloric acid, 715 ml. water and 1,110 ml. methyl alcohol was adjusted to a pH of 6 by addition of 1 $N$ NaOH and was heated to boiling and then refluxed for 40 minutes. The mixture was then centrifuged to separate a liquid fraction. The resulting nonliquid portion of the mixture was a gellike mass. To this was added 1,000 ml. water and 1,000 ml. methyl alcohol, and the resulting mixture was heated to a boil and then filtered while hot through cheesecloth to remove undigested feather residue. This filtered mixture and the liquid fraction from the centrifugation step were each heated to encourage homogeneity, and each mixture was adjusted to a pH of 4.5 by addition of 1 $N$ hydrochloric acid. The two mixtures were allowed to stand overnight, and were then filtered together through cheesecloth to remove the alcohol-water liquor and the keratin product thus isolated was dried in a vacuum oven. The yield was 129 g.

EXAMPLE D

A mixture consisting of 370 g. wet chicken feathers (200 g., dry basis), 1,830 ml. water, 2,000 ml. 95 percent ethyl alcohol and 20 ml. mercaptoethanol was heated to 80° C. and refluxed at that temperature for 20 minutes. The mixture was filtered while hot through cheesecloth to remove undigested feather residue. The filtered mixture was allowed to stand for about 60 hours, during which time the mixture assumed the character of a white gel. This gel mixture was centrifuged to remove a fraction of excess liquid, and was then vacuum dried at 50° C. The dried product was ground to a fine powder consistency. The yield was 105 g. of isolated keratin.

EXAMPLE E

A mixture of 370 g. wet chicken feathers (200 g., dry basis), 2,230 ml. water, 9.6 g. sodium hydroxide, 1,600 ml. 95 percent ethyl alcohol and 40 ml. mercaptoethanol was heated to boiling and was held there for 20 minutes. The mixture was filtered while hot and centrifuged to remove undigested feather residue. The pH of the mixture was reduced to 6 to 7 by addition of 1 $N$ hydrochloric acid, and the mixture was allowed to stand overnight. The mixture, which had assumed a gellike character, was centrifuged to remove excess solvents, and the solids fraction was vacuum dried at 50° C., to yield 121.8 g. keratin.

EXAMPLE F

Seven batches of keratin were removed from feathers according to the following procedure. A mixture of 200 g. dry feathers, 970 ml. water, 29.7 g. $(NH_4)_2SO_3 \cdot H_2O$, 60 ml. 1 $N$ hydrochloric acid and 1,110 ml. 95 percent ethanol, having a pH of about 6, was refluxed for 40 minutes. To the refluxed mixture were added 1,110 ml. water and 1,110 ml. 95 percent ethanol. The resulting mixture was filtered while hot through cheesecloth and adjusted to a pH of 4.5 by addition of hydrochloric acid. The mixture was allowed to cool and to set to a gel overnight, and was then centrifuged to remove excess liquid. The solids fraction after centrifugation was washed with portions of water and recentrifuged three times. The resulting keratin product was freeze dried. The total keratin thus isolated from the seven batches of feathers was ground to a fine powder consistency and weighed 710 g.

The keratin films and coatings which are the products of the process of this invention are prepared from alkaline dispersions of keratin in various alcohol-water mixtures.

The alcohols which are used to obtain the concentrated keratin dispersions consist of various water soluble monohydroxy aliphatic alcohols containing one to four carbon atoms. It is preferred to use such aliphatic alcohols which contain no more than three carbon atoms.

The water-alcohol ratio (volume basis) in the alkaline keratin solutions is between about 0.2:1 to about 2.7:1. The weight ratio of protein to liquid, not including plasticizers, is between about 1:3 and 1:20 in the dispersion mixtures. At protein-liquid ratios greater than about 1:3, it is difficult to obtain homogeneous films and coatings. Where the keratin-liquid ratio is less than about 1:20, homogeneous products may be produced but they tend to be thin and weak.

The alkalinity is provided in the keratin dispersions of this invention by one or more of various water soluble inorganic bases, including ammonium hydroxide and a variety of metal hydroxides. Among the preferred reagents of this type are ammonium hydroxide, sodium hydroxide and potassium hydroxide. The keratin dispersions have an alkaline pH which will be above 7.0 and up to 12 or higher.

A variety of ingredients may be included in the dispersions to impart increased flexibility to the products prepared therefrom. Such ingredients may be termed "plasticizers," and may include various polyols and higher molecular weight alcohols such as glycerol, diglycerol, 1,2,6-hexanetriol, triethanolamine, cetyl alcohol, mannitol, sorbitol and the like. Other soluble plasticizing agents employed in various protein uses may successfully be mixed in our dispersions. These materials include various fatty acid derivatives, methacrylates and citrates. Where food applications are sought for the products of this invention, plasticizers should not be used which would impart undesirable odor or taste to the products. Preferred plasticizers comprise glycerol, diglycerol and 1,2,6-hexanetriol. For example, glycerol has been used in amounts up to about 60 percent of the weight of the protein, although amounts up to about 40 percent are preferred.

When no plasticizer is included in the keratin dispersion, initially flexible films and coatings may be produced. However, such products tend to become brittle upon drying. Thus, where it is desired to form products which retain their flexibility, it is necessary either to include a plasticizer in the dispersion or to subject the product to a plasticizing treatment. Where a plasticizer is included in in the dispersion, enough should be used that the desired flexibility is attained in the products. If too much plasticizer is used, the resulting keratin containing films and coatings may tend to be weak, and their surfaces have an oily or greasy feel. Thus where a plasticizer is included, it is preferred that the weight ratio of protein to plasticizer be about 5:1 to 5:3.

When desired flexibility in the products is achieved by subjecting the products to a plasticizing treatment, means which bring the plasticizer in contact with such products will serve this result. For example, a solution of glycerol in water or ethanol provides a suitable plasticizing bath to which the keratin articles may be subjected. The films and coatings of this invention may be plasticized subsequent to their formation, for example, by immersing the same in a 20 to 80 percent solution of glycerol in water and/or ethanol.

To enhance the homogeneity of certain of the dispersion mixtures, they are heated above room temperature. However, for various dispersion mixtures, good dispersion is obtained without heating. A dispersion mixture may be heated as high as its boiling point, which is about the boiling point of the alcohol-water azeotropic mixture employed. However, satisfactory dispersion is attained in some mixtures at temperatures above room temperature, but well under their respective boiling points. Thus where good dispersion does not occur at room temperature in one of the keratin dispersion mixtures used in my process, it is preferred to heat that mixture until the dispersion is complete, but to a temperature not exceeding the boiling point of the mixture at atmospheric pressure.

Where little or no reducing agent was used during the isolation of the keratin, small amounts can be added to aid in the dispersing of the keratin in the alcohol-water dispersing medium. Representative reducing agents are sodium sulfite, sodium bisulfite, ammonium sulfite and mercaptoethanol. When used, such reducing agent can be added in an amount of 0.1 to 5.0 percent by weight based on the weight of the protein.

Although it is preferred to produce the films and coatings from keratin protein alone, the same can be replaced by amounts of up to about 50 percent by weight by a second protein or proteins provided that the film or coating properties are not adversely affected to an excessive extent. The second protein may be selected from casein, zein, gelatin, oilseed proteins, fish proteins, leaf proteins and mixtures thereof.

The dispersions may be applied to various substrate surfaces or entire articles by any of a number of methods wherein a relatively uniform coating is obtained. Thus, for example, the dispersion may be sprayed or brushed on the surface or the dispersion may be cast thereon using, for example, a spreader bar. The surface or article may also be dipped into the dispersion and then removed therefrom. Where the dried coating is to be removed from the substrate surface as a film, it is preferred to use a substantially unreactive surface such as glass, stainless steel and various plastics. The surface should not be so smooth or nonreactive that the surface tension of the dispersion tends to be greater than its adhesion to the surface. Such surfaces will not be uniformly wetted by the dispersion and will tend to give films of uneven thickness. Films can be stripped from more reactive surfaces by various physical means such as sharp blades. And, of course, where the coating is to remain on the surface such as when various foods including apple slices, candies, shelled nuts and the like are coated, it will often be desirable that the same firmly adheres to the surface or surfaces.

The coatings are allowed to dry to become solid and essentially continuous. Drying or setting of the coatings may be hastened by means commonly used to encourage evaporation of the dispersing solvents—i.e., by the use of a circulating stream of air or other gas and/or heat such as obtained by various heaters including heat lamps. However, even without such means to encourage more rapid drying, many of the coatings will set up in a matter of minutes to a few hours at ambient room temperatures and pressures. The essentially continuous films and coatings of the present invention can be of various thicknesses but will preferably be from about 0.5 to 50 mils in thickness.

The following examples will serve to further illustrate the process and products of this invention.

EXAMPLE I

To a mixture of 20 ml. water, 70 ml. ethyl alcohol (95%), and 2 ml. 6 N ammonium hydroxide were added 4.8 g. glycerol and 12 g. dry keratin prepared from feathers as in Example B. The materials were heated to the boiling point (about 75° C.), and the resulting dispersion was clarified by centrifugation for 0.5 minute at 10,000 r.p.m. The dispersion was allowed to cool to about 50° C., and films were cast on glass in air at ambient room temperature. A spreader bar with a 6 mil gap was used to form the film. The film was permitted to dry. The keratin film thus produced was about 1 mil thick and was clear, strong, flexible and without objectionable odors.

EXAMPLE II

To a mixture of 20 ml. water, 60 ml. 95 percent ethanol and 2 ml. 6 $N$ ammonium hydroxide was added 6 g. keratin prepared as in Example C. The mixture was heated for about 5 to 10 minutes in a water bath until the keratin dissolved. Walnut halves without the shells, apple slices and bark candy were dipped into the keratin dispersion and air dried on a screen. The coated objects all had a high gloss and no adverse flavor due to the coatings.

EXAMPLE III

A mixture of 30 ml. water, 30 ml. 95 percent ethyl alcohol, 1 ml. glycerol and 1 ml. concentrated ammonium hydroxide was used to disperse 5 g. feather keratin as prepared in Example C. The resulting dispersion was heated mildly and poured on a glass surface and allowed to dry at room temperature. A transparent flexible film was formed which was peeled from the glass surface.

EXAMPLE IV

To a mixture of 2 g. glycerol, 1 ml. 6 $N$ ammonium hydroxide, 15 ml. water and 15 ml. 95 percent ethyl alcohol was added 5 g. feather keratin prepared as in Example B. The keratin dispersed upon mixing and heating to about 75° C. The heated dispersion was poured on a glass surface where it rapidly thickened upon cooling to form a clear flexible film which was removed from the glass.

EXAMPLE V

A keratin dispersion was obtained from heating the following mixture: 35 ml. water, 15 ml. 95 percent ethyl alcohol, 5 g. feather keratin as prepared in Example C, 2 g. glycerol and 1 ml. 6 $N$ ammonium hydroxide. A clear flexible film was cast at room temperature on glass.

EXAMPLE VI

To a solution of 30 ml. 95 percent ethyl alcohol and 30 ml. water were added and mixed 5 g. keratin as prepared in Example C and 3 g. glycerol. Then 1 ml. ammonium hydroxide was added and the mixture was heated in a water bath to over 70° C. The resulting dispersion was poured on a flat glass plate and cast into a film using a 0.006 inch gap spreader bar. The cast dispersion dried at room temperature to yield a film which was easily removed from the glass. The film was very flexible and was quite slippery to handle.

EXAMPLE VII

To 5 g. feather keratin as prepared in Example C was added a solution of 10 ml. water, 30 ml. 95% ethanol, 2 ml. glycerol and 5 drops 10 M sodium hydroxide. The resulting mixture was heated to help disperse the keratin. A film cast from this mixture on a flat surface had a slight amber appearance and was of good strength.

EXAMPLE VIII

A mixture was prepared consisting of 5 g. keratin prepared as in Example G, 2 g. glycerol, 10 ml. water, 2 ml. 6 $N$ ammonium hydroxide and 40 ml. 95 percent ethanol. The mixture was heated to boiling to disperse the keratin, and was cast or poured on a flat glass plate. Upon evaporation of excess dispersing medium from the cast mixture, a strong and clear keratin film could be removed from the glass plate.

EXAMPLE IX

Skinless wieners were spray coated with our keratin dispersions according to the following procedure. A mixture was prepared consisting of 12 g. feather keratin as prepared in Example C, 4 g. glycerol, 27 ml. water, 99 ml. 95 percent ethanol and 6 ml. 0.5 $N$ sodium hydroxide. The mixture was heated to boiling to disperse the keratin. A portion of the heated dispersed mixture was sprayed on skinless wieners using a compressed air spraying device. The wieners were placed under a heat lamp to encourage evaporation of the dispersing medium. The wieners were refrigerated for 3 hours and were then boiled. The keratin coating adhered well to the wieners and the coated wieners had good eating qualities.

EXAMPLE X

A portion of the heated keratin dispersion mixture prepared in Example IX was sprayed, using a Paschke air brush, on one side each of four hamburger patties. The coatings on two of the patties were allowed to dry at ambient room conditions; these two coatings had a white opaque appearance on drying. The remaining two patties were placed under a heat lamp to encourage drying of the keratin coatings; when dry, the coatings were clear. The four patties were stored in a refrigerator for 3 hours. When they were stacked such that coated sides of adjacent patties were in contact, there was no sticking together of the patties when they were unstacked. Two patties were broiled and two were fried. When the cooking of each patty was completed, whether the coated side was up or down during cooking the coatings were not noticeable. The patty which was fried with the coated side down did not stick to the frying pan. All of the patties had good eating characteristics.

EXAMPLE XI

A 5 g. sample of the keratin as prepared in Example E was added to a solution containing 20 ml. water, 2 g. glycerol, 20 ml. 95 percent ethyl alcohol and 1 ml. 6 $N$ ammonium hydroxide. The mixture was heated to boiling to disperse the keratin. The dispersion was filtered while hot through a fine mesh stainless steel screen to remove any undispersed keratin particles. The hot dispersion was cast to form films on a flat glass plate using a 6 mil spreader bar. The film set up very fast. When dry the films were peeled from the glass plate. The average dry tensile strength of the film was 5,533 pounds per square inch. The average wet tensile strength of the film after a 15 minute soak in water was 1,783 pounds per square inch.

The embodiments of the invention in which an exclusive property or privilege is claimed are defined as follows:

1. The process of coating a solid substrate which comprises: (1) applying to at least a portion of one surface thereof a coating of a fluid, relatively homogeneous, alkaline dispersion of a proteinaceous substance comprising at least about 50 percent by weight of isolated keratin protein in a dispersing medium consisting of alcohol and water wherein the alcohol is a monohydroxy aliphatic alcohol of one to four carbon atoms, the dispersion obtains its alkalinity from a water soluble inorganic base, the weight ratio of protein to dispersing medium is in the range of about 1:3 to 1:20, and the volume ratio of water to alcohol is in the range of about 0.2:1 to 2.7:1; and (2) drying the coating on the substrate.

2. The process of claim 1 wherein the water soluble inorganic base is selected from the group consisting of sodium hydroxide, potassium hydroxide and ammonium hydroxide.

3. The process of claim 2 wherein the water soluble inorganic base is ammonium hydroxide.

4. The process of claim 1 wherein the proteinaceous substance consists of keratin protein.

5. The process of claim 4 wherein the keratin protein is isolated from keratin source materials by processes including the use of a reducing agent.

6. The process of claim 1 wherein the monohydroxy aliphatic alcohol contains one to three carbon atoms.

7. The process of claim 6 wherein the alcohol is ethanol.

8. The process of claim 1 wherein the dispersion also contains a plasticizer.

9. The process of claim 8 wherein the plasticizer is glycerol and the weight ratio of protein to glycerol is about 5:1 to 5:3.

10. The process of claim 1 wherein the entire substrate is coated with the dispersion.

11. The process of claim 10 wherein the substrate is an edible food.

12. The process of claim 1 wherein the dried coating is (3) stripped from the substrate surface as a relatively continuous film.

13. The process of claim 1 wherein the dried coating has a thickness of about 0.5 to 50 mils.

14. The process of claim 1 wherein the water soluble inorganic base is ammonium hydroxide, the alcohol is ethanol, the proteinaceous substance consists of keratin protein, the keratin protein is isolated from keratin source materials by processes including the use of a reducing agent, the dispersion contains glycerol, the weight ratio of glycerol to protein is in the range of about 5:1 to 5:3, the substrate has an essentially nonreactive surface and dried coating is (3) stripped from the substrate surface as a relatively continuous film.

* * * * *